United States Patent
Watanabe et al.

(10) Patent No.: US 6,962,888 B2
(45) Date of Patent: *Nov. 8, 2005

(54) DIELECTRIC CERAMIC COMPOSITION AND ELECTRONIC DEVICE

(75) Inventors: Yasuo Watanabe, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/311,464

(22) PCT Filed: Jun. 29, 2001

(86) PCT No.: PCT/JP01/05653

§ 371 (c)(1),
(2), (4) Date: Dec. 16, 2002

(87) PCT Pub. No.: WO02/00568

PCT Pub. Date: Jan. 3, 2002

(65) Prior Publication Data

US 2003/0186802 A1 Oct. 2, 2003

(30) Foreign Application Priority Data

Jun. 29, 2000 (JP) ........................................ 2000-196132

(51) Int. Cl.⁷ ........................ C04B 35/465; C04B 35/47
(52) U.S. Cl. ....................................................... 501/136
(58) Field of Search ................................ 501/136, 137, 501/138, 139

(56) References Cited

U.S. PATENT DOCUMENTS

| | | | | |
|---|---|---|---|---|
| 5,248,640 A | * | 9/1993 | Sano et al. | 501/137 |
| 5,264,402 A | * | 11/1993 | Sano et al. | 501/137 |
| 5,319,517 A | * | 6/1994 | Nomura et al. | 361/321.4 |
| 5,322,828 A | * | 6/1994 | Sano et al. | 501/137 |
| 5,510,305 A | * | 4/1996 | Sano et al. | 501/138 |
| 5,841,625 A | * | 11/1998 | Hennings et al. | 361/321.4 |
| 6,043,974 A | * | 3/2000 | Chen et al. | 361/311 |
| 6,118,648 A | * | 9/2000 | Kojima et al. | 361/311 |
| 6,291,380 B1 | * | 9/2001 | Yokoi et al. | 501/138 |
| 6,437,970 B1 | * | 8/2002 | Lee et al. | 361/311 |
| 6,627,570 B2 | * | 9/2003 | Fukui et al. | 501/136 |
| 6,645,895 B2 | * | 11/2003 | Sato et al. | 501/136 |
| 6,656,863 B2 | * | 12/2003 | Fukui et al. | 501/136 |
| 6,733,897 B2 | * | 5/2004 | Choi et al. | 428/472 |
| 6,790,801 B2 | * | 9/2004 | Kim et al. | 501/136 |

FOREIGN PATENT DOCUMENTS

| | | |
|---|---|---|
| JP | B 57-37081 | 8/1982 |
| JP | A 60-131708 | 7/1985 |
| JP | A 63-126117 | 5/1988 |
| JP | 3-53408 | * 3/1991 |
| JP | A 5-250916 | 9/1993 |
| JP | A 5-314817 | 11/1993 |
| JP | A 6-139821 | 5/1994 |
| JP | A 7-78510 | 3/1995 |
| JP | A 7-211140 | 8/1995 |
| JP | A 10-270284 | 10/1998 |
| JP | A 11-224827 | 8/1999 |
| JP | B2 2997236 | 10/1999 |
| JP | 2000-109361 | * 4/2000 |
| JP | 2000-143343 | * 5/2000 |
| JP | 2000-143344 | * 5/2000 |
| JP | A 2000-516190 | 12/2000 |

\* cited by examiner

*Primary Examiner*—Karl Group
(74) *Attorney, Agent, or Firm*—Oliff & Berridge, PLC

(57) ABSTRACT

A dielectric ceramic composition comprising a main component including a dielectric oxide expressed by a composition formula $\{(Ca_{1-x}Me_x)O\}_m \cdot (Zr_{1-y}Ti_y)O_2$, and a first subcomponent including at least one of oxides selected from V, Nb, W, Ta, Mo and Cr and compounds which become an oxide of these after firing; wherein a symbol Me in the formula included in the main component is at least one of Sr, Mg and Ba, symbols m, x and y indicating composition mole ratios in the formula included in the main component are $0.8 \leq m \leq 1.3$, $0 \leq x \leq 1.00$ and $0.1 \leq y \leq 0.8$, and a ratio of the first subcomponent to 100 moles of the main component is 0.01 atomic % $\leq$ the first subcomponent < 5 atomic % in a conversion of metal element in an oxide.

12 Claims, 2 Drawing Sheets

DIELECTRIC CERAMIC COMPOSITION AND ELECTRONIC DEVICE

TECHNICAL FIELD

The present invention relates to a dielectric ceramic composition used, for example, as a dielectric layer of a multilayer ceramic capacitor and an electronic device using the dielectric ceramic composition as a dielectric layer.

BACKGROUND ART

A multilayer ceramic capacitor as an example of electronic devices is formed by printing a conductive paste on a green sheet made by a predetermined dielectric ceramic composition, stacking a plurality of the green sheets on which the conductive paste is printed, and integrally firing the green sheets and internal electrodes.

A conventional dielectric ceramic composition had a property of being reduced and becoming semiconductive when fired in a neutral or reducing atmosphere having a low oxygen partial pressure. Therefore, when producing a multilayer ceramic capacitor, it was inevitable to fire in an oxidizing atmosphere having a high oxygen partial pressure. Due to this, as an internal electrode material to be fired together with the dielectric ceramic composition, it has been required to use expensive precious metals (for example, palladium and platinum) which are not fused at a temperature the dielectric ceramic composition is sintered and not oxidized even when fired in an oxidizing atmosphere. It has been a big obstacle of realizing a low price of a multilayer ceramic capacitor to be produced.

To use inexpensive base metals (for example, nickel and copper) as a material of an internal electrode, it is necessary to develop a dielectric ceramic composition which does not become semiconductive even when fired in a neutral or reducing atmosphere, that is, has an excellent reducing resisting property and has a sufficient specific dielectric constant and excellent dielectric characteristics after firing (for example, having a small capacity-temperature change rate).

Conventionally, a variety of proposals have been made for dielectric ceramic compositions capable of using a base metal as a material of an internal electrode.

For example, the Japanese Unexamined Patent Publication No. 11-224827 discloses a dielectric ceramic composition composed of a main component made by a dielectric oxide having a composition expressed by $(Ca_{1-x}Me_x)_m \cdot (Zr_{1-y}Ti_y)O_3$ (note that $0.90 < m < 1.10$, $0.1 \leq x \leq 0.9$, $0 \leq y \leq 0.5$) and $SiO_2$, $B_2O_3$, $Mn_2O_3$ and $Ln_2O_3$ (note that Ln is at least one or two kinds of elements selected from Sc, Y, La, Ce, Pr, Nd, Pm, Sm, Eu, Gd, Tb, Dy, Ho, Er, Tm, Yb and Lu), wherein a content ratio of $SiO_2 + B_2O_3$ in the dielectric ceramic composition is 0.1 to 5 wt %, a content ratio of $Mn_2O_3$ is 0.1 to 3.0 atomic % and a content ratio of $Ln_2O_3$ is 0.03 to 1.0 atomic %.

Also, the Japanese Unexamined Patent Publication No. 60-131708 discloses a dielectric ceramic composition composed of a main component made by a dielectric oxide having a composition expressed by $(Ca_{1-x}Sr_x)_m \cdot (Zr_{1-y}Ti_y)O_3$ (note that $0.85 < m < 1.30$, $0 \leq x < 0.6$, $0 \leq y < 0.6$) and $zMnO_2$ (note that $0.005 < z < 0.08$ in a weight ratio with respect to 1.00 of the main component).

Furthermore, the Japanese Examined Patent Publication No. 57-37081 discloses a dielectric ceramic composition composed of a main component made by a dielectric oxide having a composition expressed by $(Ca_{1-x}Ba_x)_m \cdot ZrO_3$ (note that $0.85 < m < 1.30$, $0 < x < 0.2$) and $zMnO_2$ (note that $0.005 < z < 0.08$ in a weight ratio with respect to 1.00 of the main component).

Moreover, the Japanese Unexamined Patent Publication No. 63-126117 discloses a dielectric ceramic composition containing a dielectric oxide having a composition expressed by $(Ca_{1-x}Sr_x)_m \cdot (Zr_{1-y}Ti_y)O_3$ (note that $0.85 < m < 1.30$, $0 \leq x < 0.6$, $0 \leq y < 0.6$) as a main component and 0.5 to 8 parts by weight of $MnO_2$ and 0.5 to 8 parts by weight of glass component (note that the glass component uses predetermined mole ratios of $Li_2O$, RO (note that R is at least one kind selected from Ba, Sr, Ca and Mg), (Ti, Si)$O_2$ and $Al_2O_3$) with respect to 100 parts by weight of the main component).

However, any of the dielectric ceramic compositions described in the above publications had disadvantages that dielectric characteristics (capacity change, dielectric loss) were deteriorated by a low frequency after firing, or an accelerated lifetime of insulation resistance was short, and reliability of an obtained multilayer ceramic capacitor became poor when producing a multilayer ceramic capacitor having an internal electrode made by a base metal, such as nickel, by using the dielectric ceramic composition.

DISCLOSURE OF INVENTION

An object of the present invention is to provide a dielectric ceramic composition having an excellent reducing resisting property at firing and excellent low frequency dielectric characteristics after firing, moreover, capable of improving an accelerated lifetime of insulation resistance. Also, an object of the present invention is to provide a chip capacitor and other electronic devices having an excellent capacity-temperature characteristics and high credibility.

To attain the above object, a dielectric ceramic composition comprising:

a main component including a dielectric oxide expressed by a composition formula $\{(Ca_{1-x}Me_x)O\}_m \cdot (Zr_{1-y}Ti_y)O_2$, and a first subcomponent including at least one of oxides selected from V, Nb, W, Ta, Mo and Cr and compounds which become an oxide of these after firing;

wherein a symbol Me in the formula included in the main component is at least one of Sr, Mg and Ba, symbols m, x and y indicating composition mole ratios in the formula included in the main component are $0.8 \leq m \leq 1.3$, $0 \leq x \leq 1.00$ and $0.1 \leq y \leq 0.8$, and a ratio of the first subcomponent to 100 moles of the main component is 0.01 atomic % ≤ the first subcomponent < 5 atomic % in a conversion of metal element in an oxide.

Preferably, the dielectric ceramic composition according to the present invention further comprises a third subcomponent including at least one of oxides of Si, M (note that M is at least one element of Ba, Ca, Sr and Mg), Li and B and compounds which become an oxide of these after firing; and wherein a ratio of the third subcomponent to 100 moles of the main component is 0 mole < the third subcomponent < 15 moles in a conversion of oxide.

Particularly preferable state of the third subcomponent is as described below. More preferably, the dielectric ceramic composition according to the present invention further comprises a third subcomponent including at least one of oxides of Si and Sr and compounds which become an oxide of these after firing; and wherein a ratio of the third subcomponent to 100 moles of the main component is 0 mole < the third subcomponent<15 moles in a conversion of oxide. The third subcomponent acts mainly as a sintering auxiliary.

Preferably, in the dielectric ceramic composition according to the present invention, a static capacitance change rate (ΔC) to a temperature is −3000 to 0 ppm/° C., preferably, −2000 to 0 ppm/° C., more preferably, −1000 to 0 ppm/° C. in a temperature range of at least 25 to 125° C. Note that a reference temperature of a static capacitance C is 25° C.

To attain the above object, an electronic device according to the present invention comprises a dielectric layer composed of any of the above dielectric ceramic composition.

Preferably, the electronic device according to the present invention comprises a capacitor element body wherein the dielectric layers and internal electrode layers are alternately stacked.

Preferably, in the electronic device according to the present invention, a conductive material included in the internal electrode layer is nickel or a nickel alloy.

The dielectric ceramic composition according to the present invention has excellent reducing resistance at firing and excellent capacity-temperature characteristics after firing by being added a predetermined amount of a specific first subcomponent to a main component containing a dielectric oxide having a specific composition, and wherein low frequency dielectric dispersion (for example, a dielectric loss at 160° C. and 100 Hz) is suppressed and an accelerated lifetime (high temperature load lifetime) of insulation resistance is improved comparing with the case of being added no first subcomponent.

In the electronic device, such as a chip capacitor, according to the present invention, since a dielectric layer composed of a dielectric ceramic composition according to the present invention is provided, excellent capacity-temperature characteristics are obtained, low frequency dielectric dispersion is suppressed and an accelerated lifetime (high temperature load lifetime) of insulation resistance is improved, as a result, reliability of the electronic device is improved.

BEST MODE FOR CARRYING OUT THE INVENTION

Figure 1:
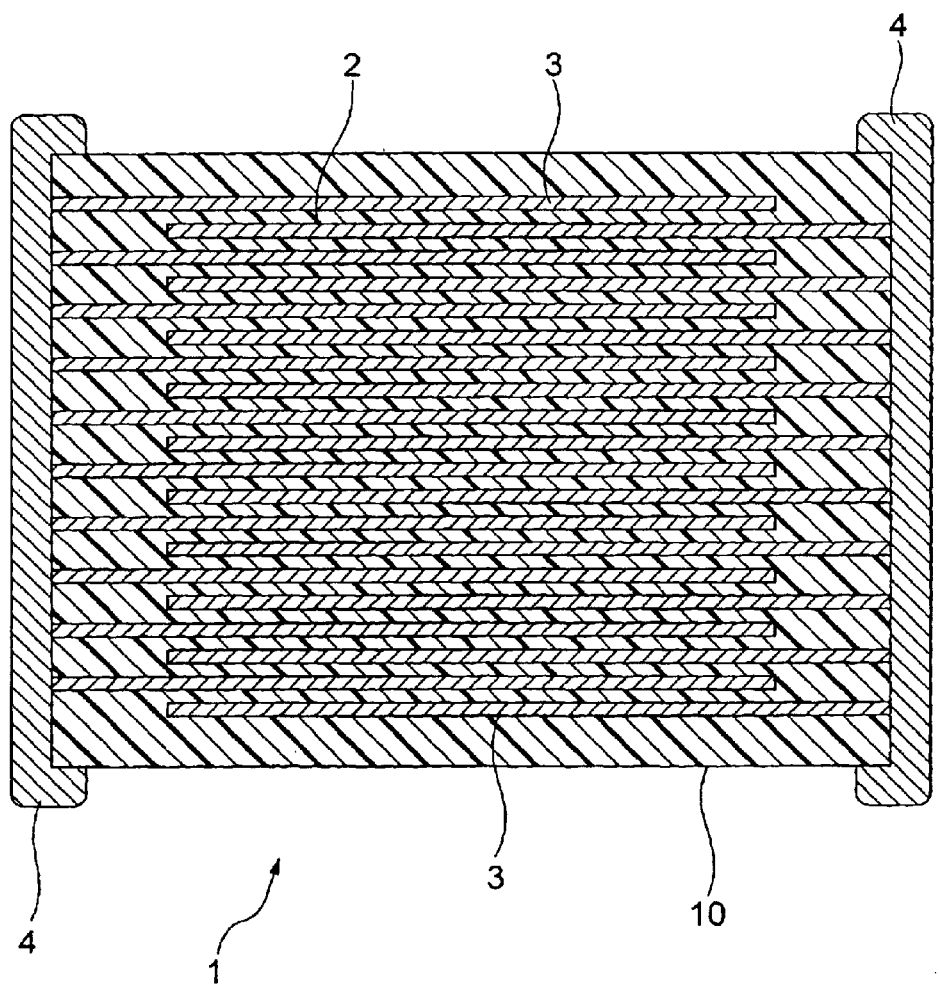
FIG. 1 is a cross-sectional view of a multilayer ceramic capacitor according to an embodiment of the present invention.
Figure 2:
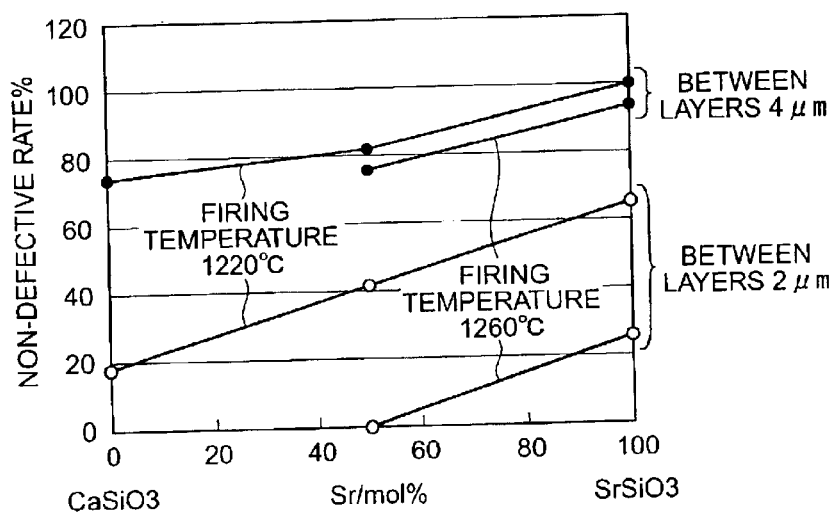
FIG. 2 is a graph of a relationship of a content ratio of Sr in $(Sr_p, Ca_{1-p})SiO_3$ as a third subcomponent and a non-defective rate of initial insulation resistance (IR) in capacitor samples.

Below, the present invention will be explained based on a preferred embodiment illustrated in the drawings.

In the present embodiment, a multilayer ceramic capacitor 1 shown in FIG. 1 will be described as an example of an electronic device and the configuration and production method will be explained.

Multilayer Ceramic Capacitor

As shown in FIG. 1, the multilayer ceramic capacitor 1 as an electronic device according to an embodiment of the present invention comprises a capacitor element body 10 wherein dielectric layers 2 and internal electrode layers 3 are alternately stacked. On both end portions of the capacitor element body 10 are formed a pair of external electrodes 4 respectively conductive with the internal electrode layers 3 alternately arranged inside the element body 10. A shape of the capacitor element body 10 is not particularly limited but is normally rectangular parallelepiped shape. Also, a size thereof is not particularly limited and may be a suitable size in accordance with use, but is normally (0.6 to 5.6 mm)×(0.3 to 5.0 mm)×(0.3 to 1.9 mm) or so.

The internal electrode layers 3 are stacked so that the respective end surfaces are alternately exposed to surfaces of two end portions facing to each other of the capacitor element body 10. The pair of external electrodes 4 are formed on the both end portions of the capacitor element body 10 and connected to the exposed end surfaces of the alternately arranged internal electrode layers 3 so as to form a capacity circuit.

Dielectric Layer 2

The dielectric layer 2 includes a dielectric ceramic composition according to the present invention.

The dielectric ceramic composition according to the present invention includes at least a main component containing a dielectric oxide expressed by a composition formula $\{((Ca_{1-x}Me_x)O\}_m \cdot (Zr_{1-y}Ti_y)O_2$ and a specific first subcomponent. At this time, an oxygen (O) amount may be slightly different from a stoichiometric composition of the above formula.

In the above composition formula, x satisfies $0 \leq x \leq 1.00$. The x indicates the number of Me atoms (note that Me is at least one of Sr, Mg and Ba) and by changing the x, that is, a Me/Ca ratio, it becomes possible to freely shift a phase transition point of crystal. Consequently, a capacity-temperature coefficient and a specific dielectric constant can be freely controlled. Note that in the present invention, the ratio of Ca and Me may be any and only one of the two may be contained.

In the above formula, $0.1 \leq y \leq 0.8$. The y indicates the number of Ti atoms and by replacing $ZrO_2$ which is hard to be reduced comparing with $TiO_2$, reducing resisting property tends to become even stronger.

In the above formula, $0.8 \leq m \leq 1.3$, preferably, $0.970 \leq m \leq 1.030$. By making the m 0.8 or more, it is prevented to become semiconductive in firing in a reducing atmosphere, and by making the m 1.3 or less, a dense sintered body can be obtained even when a firing temperature is not set high.

What the dielectric ceramic composition of the present invention differs from the conventional dielectric ceramic composition is that a range of the y is $0.1 \leq y \leq 0.8$ and a predetermined amount of a predetermined first subcomponent is added. By adding a predetermined amount of the predetermined first subcomponent, firing at a low temperature becomes possible without declining dielectric characteristics when the y as a main component is in the range of $0.1 \leq y \leq 0.8$, and an accelerated lifetime (high temperature load lifetime) of insulation resistance can be improved while suppressing low frequency dielectric dispersion even when the dielectric layer becomes thinner, so reliability can be widely improved. As a result, the capacitor can be made compact with a large capacity.

In the present invention, the first subcomponent contains at least one of oxides of 5 group elements (V, Nb, Ta) of periodic table, oxides of 6 group elements (Cr, Mo, W) of periodic table and compounds which becomes oxides of these after firing. The first subcomponent acts as a substance for lowering a sintering temperature and improving the accelerated lifetime (high temperature load lifetime) of insulation resistance while suppressing low frequency dielectric dispersion.

In the present invention, a ratio of the first subcomponent with respect to 100 moles of the main component is 0.01 atomic %≦first subcomponent<5 atomic % in a conversion of metal element in oxides. By setting the ratio of the first subcomponent within the range of 0.01 atomic %≦first subcomponent<5 atomic % in a conversion of metal element in oxides, the accelerated lifetime (high temperature load lifetime) of insulation resistance can be improved while suppressing low frequency dielectric dispersion when y is in a range of 0.1≦y≦0.8.

Also, the dielectric ceramic composition according to the present invention is preferably added a third subcomponent containing at least one of oxides of Si, M (note that M is at least one element of Ba, Ca, Sr and Mg), Li and B (for example, $SiO_2$, MO, $Li_2O$ and $B_2O_3$) and compounds which become an oxide of these after firing. The third subcomponent acts mainly as a sintering auxiliary and also gives an effect of improving a defective rate of initial insulation resistance (IR) when the layers becomes thinner. In terms of the defective rate improvement, it is preferable to contain at least one of oxides of Si and Sr (for example, $SiO_2$, SrO, $SrSiO_3$) and compounds which become an oxide of these after firing, and particularly preferable to contain $SrSiO_3$. A ratio of the third subcomponent with respect to 100 moles of the main component is 0 mole<the third subcomponent<15 moles, preferably, 0.2 mole≦the third subcomponent≦6 moles in a conversion of oxide. By making the adding amount of the third subcomponent more than 0 mole, an initial IR defective rate can be effectively decreased, while by making the adding amount less than 15 moles, the specific dielectric constant can be suppressed low and a sufficient capacity can be secured.

Note that the dielectric ceramic composition according to the present invention may be further added a second subcomponent containing at least one of an oxide of Mn (for example, MnO) and compounds which becomes an oxide of Mn by firing (for example, $MnCO_3$). The second subcomponent gives an effect of accelerating sintering and improving a high temperature load lifetime, furthermore, an effect of decreasing the defective rate of initial insulation resistance when the dielectric layer 2 is made thinner to, for example, about 4 μm or so. When adding the second subcomponent, a ratio of the second subcomponent with respect to 100 moles of the main component is 0 mole≦the second subcomponent<4 moles, preferably, 0.05 mole≦the second subcomponent≦1.4 moles in a conversion of metal element in oxides. When the adding amount of the second subcomponent is 4 moles or more, it is liable that the initial insulation resistance cannot be got, while when the adding amount of the second subcomponent is in the range of 0 mole≦the second subcomponent<4 moles, the larger the adding amount, the more the high temperature load lifetime is improved, furthermore, the initial IR defective rate can be decreased, while the smaller the adding amount, the smaller the capacity-temperature change rate can be.

The dielectric ceramic composition according to the present invention may be further added a fourth subcomponent containing an oxide of R (note that R is at least one element of Sc, Y, La, Ce, Pr, Nd, Pm, Sm, Eu, Gd, Tb, Dy, Ho, Er, Tm, Yb and Lu). The fourth subcomponent gives an effect of improving the high temperature load lifetime and also an effect of improving the initial IR defective rate when the layers become thinner. In terms of the defective rate improvement, it is preferable to contain at least one of oxides of Sc, Y, Ce, Dy, Ho, Er, Tm, Yb and Lu. When adding the fourth subcomponent, a ratio of the fourth subcomponent with respect to 100 moles of the main component is 0.02 atomic %≦the fourth subcomponent<2 atomic %, preferably, 0.02 atomic %≦the fourth subcomponent≦1 atomic %.

Note that the number of layers, thickness and other conditions of the dielectric layer 2 shown in FIG. 1 may be suitably determined in accordance with an object and use. Also preferably, the dielectric layer 2 is composed of grains and a grain boundary phase and an average particle diameter of the grains of the dielectric layer 2 is 0.2 to 5 μm or so. Normally, the grain boundary phase has as its components oxides of materials composing the dielectric material or the internal electrode material, oxides of separately added materials, furthermore, oxides of materials mixed therein as impurities during producing steps, and is normally composed of glass or vitreous material.

Internal Electrode Layer 3

Conductive materials contained in the internal electrode layer 3 is not particularly limited and a base metal can be used because components of the dielectric layer 2 have reducing resisting property. As the base metal, Ni or a Ni alloy is preferable. As a Ni alloy, an alloy of at least one element selected from Mn, Cr, Co and Al and Ni is preferable and a content of Ni in the alloy is preferably 95 wt % or more. Note that the Ni or Ni alloy may contain about 0.1 wt % or less of a variety of trace components, such as P, Fe and Mg. A thickness of the internal electrode layer may be suitably determined in accordance with use, etc. and normally is 0.5 to 5 μm and particularly preferably 1 to 2.5 μm or so.

External Electrode 4

Conductive materials contained in the external electrodes 4 are not particularly limited and normally Cu, a Cu alloy, Ni or a Ni alloy, etc. are used. Note that Ag, an Ag—Pd alloy, etc. can be naturally used. Note that in the present embodiment, inexpensive Ni, Cu or alloys of these are used. A thickness of the external electrodes may be suitably determined in accordance with use, etc. but normally 10 to 50 μm or so is preferable.

Production Method of Multilayer Ceramic Capacitor

A multilayer ceramic capacitor using the dielectric ceramic composition of the present invention is produced in the same way as in conventional multilayer ceramic capacitors, that is, by preparing a green chip by a normal printing method and a sheet method using a paste, firing the same, printing or transferring an external electrode and firing. Below, a production method will be specifically explained.

First, a dielectric layer paste, an internal electrode paste and an external electrode paste are prepared, respectively.

Dielectric Layer Paste

The dielectric layer paste may be an organic based paint obtained by kneading dielectric materials and an organic vehicle or a water-soluble based paint.

Materials composing a main component and materials composing first to fourth subcomponents are used for the dielectric materials in accordance with a composition of the dielectric ceramic composition according to the present invention described above.

As materials composing the main component, oxides of Sr, Ca, Ba, Ti, Zr and Mg and/or compounds which become an oxide by firing are used.

As materials composing the first subcomponent, at least one single oxide or complex oxide of at least one of oxides selected from V, Nb, W, Ta, Cr, Mo and Cr and compounds which become an oxide of these after firing are used.

As materials composing the second subcomponent, at least one single oxide or complex oxide of an oxide of Mn and compounds which becomes an oxide of Mn by firing are used.

As materials composing the third subcomponent, at least one of oxides of Si, M (note that M is at least one element of Ba, Ca, Sr and Mg), Li and B and compounds which become an oxide of these after firing are used.

As materials composing the fourth subcomponent, an oxide of R (note that R is at least one element of Sc, Y, La, Ce, Pr, Nd, Pm, Sm, Eu, Gd, Tb, Dy, Ho, Er, Tm, Yb and Lu) is used.

Note that as compounds which become an oxide by firing, for example, carbonate, nitrite, oxalate, organic metal compounds, etc. can be mentioned. It is needless to say but an oxide and a compound which becomes an oxide by firing may be used together. A content of each of compounds in the dielectric material may be determined so as to be a composition of the above dielectric ceramic composition after firing. As material powders of these, those having an average particle diameter of 0.0005 to 5 $\mu$m or so are normally used.

The organic vehicle is obtained by dissolving a binder in an organic solvent. The binder used for the organic vehicle is not particularly limited and may be suitably selected from normal binders, such as ethyl cellulose, polyvinil butyral. Also, the organic solvent used at this time is not particularly limited and may be suitably selected from organic solvents, such as terpineol, butylcarbitol, acetone and toluene, in accordance with a method to be used, such as a printing method and a sheet method.

The water-soluble paint is obtained by dissolving a water-soluble binder, dispersant, etc. in water. The water-soluble binder is not particularly limited and may be suitably selected from polyvinyl alcohol, cellulose, water-soluble acrylic resin, emulsion, etc.

Internal Electrode Paste, External Electrode Paste

The internal electrode paste is fabricated by kneading conductive materials composed of the above variety of conductive metals and alloys, a variety of oxides which become the above conductive materials after firing, organic metal compounds, resinates, etc. with the above organic vehicle. Also, the external electrode paste is fabricated in the same way as in the internal electrode paste.

A content of the organic vehicle in each of the above pastes is not particularly limited and may be a normal content, that is, for example, 1 to 5 wt % or so of a binder and 10 to 50 wt % or so of a solvent. Also, additives selected form a variety of dispersants, plasticizers, dielectrics, insulating materials, etc. may be added to the respective pastes in accordance with need.

When using a printing method, the dielectric paste and the internal electrode paste are printed by stacking on a substrate made by polyethylene terephthalate, etc., cut to be a predetermined shape and removed from the substrate to obtain a green chip. On the other hand, when using a sheet method, a green sheet is formed by using the dielectric paste, the internal electrode paste is printed thereon, then, the both are stacked to form a green chip.

Next, the green chip is subjected to binder removing processing and firing.

Binder Removing Processing

The binder removing processing may be performed under normal conditions, but particularly when a base metal, such as Ni and a Ni alloy, is used as conductive material of the internal electrode layer, the conditions are preferably a temperature rising rate of 5 to 300° C./hour, more preferably, 10 to 100° C./hour, a holding temperature of 180 to 400° C., more preferably, 200 to 300° C. and a temperature holding time of 0.5 to 24 hours, more preferably, 5 to 20 hours in the air atmosphere.

Firing

A firing atmosphere for the green chip may be suitably determined in accordance with a kind of the conductive material in the internal electrode paste, but when a base metal, such as Ni and a Ni alloy, is used as the conductive material, an oxygen partial pressure in the firing atmosphere is preferably $10^{-10}$ to $10^{-3}$ Pa, more preferably, $10^{-10}$ to $6 \times 10^{-5}$ Pa. When the oxygen partial pressure at firing is too low, the conductive material of the internal electrode causes abnormal sintering which ends up in breaking, while when the oxygen partial pressure is too high, the internal electrode is liable to be oxidized.

The holding temperature at firing is 1000 to 1400° C., more preferably, 1200 to 1380° C. It is because when the holding temperature is too low, densification becomes insufficient, while when the holding temperature is too high, electrodes break due to abnormal sintering of the internal electrodes or the capacity-temperature characteristics declines due to dispersion of the internal electrode material.

Firing conditions other than the above are preferably a temperature rising rate of 50 to 500° C./hour, more preferably 200 to 300° C./hour, a temperature holding time of 0.5 to 8 hours, more preferably 1 to 3 hours, and a cooling rate of 50 to 500° C./hour, more preferably 200 to 300° C./hour, and a firing atmosphere is preferably a reducing atmosphere and it is preferable to use a wet mixed gas of nitrogen gas and a hydrogen gas as the atmosphere gas.

When sintering in a reducing atmosphere, it is preferable to perform annealing (thermal treatment) on a capacitor chip sintered body.

Annealing (Thermal Treatment)

Annealing is processing for re-oxidizing the dielectric layers and insulation resistance can be increased thereby. An oxygen partial pressure of an annealing atmosphere is preferably $10^{-4}$ Pa or more, more preferably $10^{-1}$ to 10 Pa. When the oxygen partial pressure is too low, re-oxidization of the dielectric layers 2 becomes difficult, while when the oxygen partial pressure is too high, the internal electrodes 3 are liable to be oxidized.

A holding temperature of the annealing is preferably 500 to 1100° C. but is not particularly limited. When the holding temperature is too low, re-oxidization of the dielectric layers tends to become insufficient which results in deterioration of insulation resistance and accelerated lifetime thereof also becomes short. While, when the holding temperature is too high, not only deteriorating the capacity as a result that the internal electrodes are oxidized, but reaction with a dielectric base occurs, so that the capacity-temperature characteristics, insulation resistance and the accelerated lifetime are liable to be deteriorated. Note that the annealing may be composed only of a temperature raising step and temperature lowering step. In this case, the temperature holding time is zero and the holding temperature and the highest temperature are synonymous.

Preferably, annealing conditions other than the above are a temperature holding time of 0 to 20 hours, more preferably 6 to 10 hours, a cooling rate of 50 to 500° C./hour, more preferably 100 to 300° C./hour, and it is preferable to use as an atmosphere gas for annealing, for example, a wet nitrogen gas.

Note that, in the same way as in the above firing, to wet a nitrogen gas or a mixed gas in the above binder removing processing and annealing processing, for example a wetter, etc. can be used. In this case, a water temperature is preferably 0 to 75° C.

Also, the binder removing processing, firing and annealing may be successively performed or separately performed. When successively performing these processing, it is preferable that an atmosphere is changed without cooling after the binder removing processing, then, the temperature is raised to a holding temperature at the time of firing to perform firing, then the atmosphere is changed when the temperature is cooled to reach a holding temperature for annealing so as to perform annealing. On the other hand, when performing separately, it is preferable that firing is performed after the temperature is raised to a holding temperature at the time of the binder removing processing in a nitrogen gas or wet nitrogen gas atmosphere, then, the atmosphere is changed to continue to raise the temperature, and after the temperature is cooled to a holding temperature for annealing, the atmosphere is changed again to a nitrogen gas or a wet nitrogen gas to continue to cool. Also, in annealing, the atmosphere may be changed after the temperature is raised to a holding temperature in a nitrogen gas atmosphere, or the whole annealing processing may be performed in a wet nitrogen gas atmosphere.

The thus obtained capacitor sintered body is subjected to end surface polishing, for example, by barrel polishing or sandblast, printed or transferred an external electrode paste and fired to form the external electrodes 4. Firing conditions of the external electrode paste are preferably, for example, at 600 to 800° C. for 10 minutes to 1 hour or so in a mixed gas of a wet nitrogen gas and hydrogen gas. On surfaces of a pair of the external electrodes 4 may be formed a coating layer (pad layer) by soldering, etc. in accordance with need.

The thus obtained multilayer ceramic capacitor 1 of the present embodiment is mounted on a printed circuit board by soldering, etc. and used in a variety of electronic equipments.

Embodiments of the present invention were explained above, but the present invention is not limited to the embodiments and can be embodied in a variety of ways within the scope of the present invention.

For example, in the above embodiments, a multilayer ceramic capacitor was taken as an example of an electronic device according to the present invention, but electronic devices according to the present invention are not limited to a multilayer ceramic capacitor and may be any devices having a dielectric layer composed of a dielectric ceramic composition having the above composition.

Next, the present invention will be explained further in detail by taking examples wherein embodiments of the present invention will be more specifically embodied. Note that the present invention is not limited to the examples.

EXAMPLE 1

First, as starting materials to produce a dielectric material, materials of a main component (SrCO$_3$, CaCO$_3$, TiO$_2$, ZrO$_2$, MgO) and materials of first to third subcomponents respectively having an average particle diameter of 0.1 to 1 $\mu$m were prepared. Carbonate (the second subcomponent: MnCO$_3$) was used as a material of MnO and oxides (the first subcomponent: V$_2$O$_5$, the third subcomponent: SiO$_2$+CaO) were used for other materials. Note that as to the third subcomponent SiO$_2$+CaO, the same characteristics could be obtained by using CaSiO$_3$ obtained by performing wet mixing by a ball mill for 16 hours on SiO$_2$ and CaO, drying, then, performing firing at 1150° C. in the air, furthermore, performing wet pulverizing by a ball mill for 100 hours.

The above materials were weighed so that a composition after firing comes to have blending ratios shown in Table 1 and Table 2 in a composition formula $\{(Ca_{1-x}Sr_x)O\}_m \cdot (Zr_{1-y}Ti_y)O_2$ (main component)+V$_2$O$_5$ (the first subcomponent)+MnCO$_3$ (the second subcomponent)+(SiO$_2$+CaO) (the third subcomponent), then, each of them was subjected to wet mixing by a ball mill for about 16 hours and dried to obtain a dielectric ceramic composition (dielectric materials).

A hundred parts by weight of the thus obtained dried dielectric materials were mixed with 4.8 parts by weight of an acrylic resin, 40 parts by weight of dichloromethane, 20 parts by weight of methyl acetate, 6 parts by weight of mineral spirits and 4 parts by weight of acetone by using a ball mill to make a paste to obtain a dielectric layer paste.

Next, an internal electrode paste was obtained by kneading by using a triple-roll 100 parts by weight of Ni particle having an average particle diameter of 0.2 to 0.8 $\mu$m, 40 parts by weight of organic vehicle (8 parts by weight of ethyl cellulose was dissolved in 92 parts by weight of butyl carbitol) and 10 parts by weight of butyl carbitol.

Next, an external electrode paste was obtained by kneading 100 parts by weight of Cu particle having an average particle diameter of 0.5 $\mu$m, 35 parts by weight of organic vehicle (8 parts by weight of an ethyl cellulose resin was dissolved in 92 parts by weight of butyl carbitol) and 7 parts by weight of butyl carbitol.

Next, the above dielectric layer paste was used for forming a green sheet of a thickness of 6 $\mu$m on a PET film, the internal electrode paste was printed thereon, and then, the green sheet was removed from the PET film.

Next, the green sheets and protective green sheets (on which the internal electrode paste was not printed) were stacked and pressured to obtain a green chip. The number of stacked layers in the sheet having the internal electrodes was 4.

Then, the green chip was cut to a predetermined size and subjected to binder removing processing, firing and annealing (heat treatment) to obtain a multilayer ceramic sintered body. The binder removing processing was performed under conditions of a temperature raising time of 15° C./hour, a holding temperature of 280° C. and a holding time of 8 hours in the air atmosphere. Firing was performed under conditions of a temperature raising rate of 200° C./hour, a holding temperature of 1200 to 1380° C., a holding time of 2 hours and a temperature cooling rate of 300° C./hour, in a wet N$_2$+H$_2$ mixed gas atmosphere (an oxygen partial pressure was adjusted to be in a range of $2 \times 10^{-7}$ to $5 \times 10^{-4}$ Pa). Annealing was performed under conditions of a holding temperature of 900° C., a temperature holding time of 9 hours, a temperature cooling rate of 300° C./hour in a wet N$_2$ gas atmosphere (oxygen partial pressure was $3.54 \times 10^{-2}$ Pa).

Note that to wet the atmosphere in the firing and annealing, a wetter of a water temperature of 35° C. was used.

Next, after polishing end surfaces of the multilayer ceramic sintered body by sandblast, the external electrode paste was transferred to the end surfaces, and external electrodes were formed by firing at 800° C. for 10 minutes in a wet N$_2$+H$_2$ mixed gas atmosphere to obtain multilayer ceramic capacitor samples having a configuration shown in FIG. 1. The thus obtained capacitor samples had a size of 3.2 mm×1.6 mm×0.6 mm, wherein the number of dielectric layers sandwiched by two internal electrodes was 4, a thickness thereof was 4 $\mu$m and the thickness of the internal electrode layers was 2 $\mu$m. The following properties were evaluated on the respective samples.

Specific Dielectric Constant ($\epsilon$), Dielectric Loss (tan $\delta$) Insulation Resistance (IR)

A static capacitance and a dielectric loss (tan $\delta$, unit was %) were measured on the capacitor samples at a reference temperature of 25° C. by a digital LCR meter (4274A made by YHP Company) under conditions of a frequency of 1 MHz and an input signal level (measurement voltage) of 1 Vrms. Then, a specific dielectric constant ($\epsilon$, no unit) was calculated from the obtained static capacitance, an electrode size and a distance between electrodes of the capacitor samples. The insulation resistance (IR, unit was $\Omega$cm) was obtained by measuring a specific resistance $\rho$ after applying DS 50V to the capacitor samples at 25° C. for 60 seconds by using an insulation resistance tester (R8340A made by Advantest Corporation), and calculating from the measured value, an electrode area and a thickness of the capacitor samples. The results are shown in Table 1 and Table 2. Respective values of the specific dielectric constant $\epsilon$, specific resistance $\rho$ and dielectric loss tan $\delta$ were obtained from an average value of measured values by using the number of capacitor samples of n=10.

Temperature Characteristics of Static Capacitance

A static capacitance of 1 MHz and a voltage of 1V was measured on the capacitor samples by using an LCR meter and whether a static capacitance change rate with respect to the temperature satisfies −3000 to 0 ppm/° C. in a temperature range of 25 to 125° C. when the reference temperature was set to 25° C. was investigated. The results are shown in Table 1 and Table 2. The capacity-temperature constant $\tau c$ (1 MHz) (ppm/° C.) was calculated from the formula below. Note that in the formula, $C_{125}$ indicates a static capacitance at 125° C. and $C_{25}$ indicates a static capacitance at 25° C. (1 MHz).

Note that the capacity temperature constant $\tau c$ (100 Hz) at 100 Hz is expressed in the same way in the formula 2.

$$\tau c\ (1\ \text{MHz}) = \{(C_{125} - C_{25})/C_{25}\} \times (1/100) \qquad \text{formula 1}$$

$$\tau c\ (100\ \text{Hz}) = \{(C_{125} - C_{25})/C_{25}\} \times (1/100) \qquad \text{formula 2}$$

High Temperature Load Lifetime (Accelerated Lifetime of Insulation Resistance)

A high temperature load lifetime was measured on the capacitor samples by keeping them in a state of being applied a DC voltage of 15 to 60 V/$\mu$m at 200° C. The high temperature load lifetime was measured on 10 capacitor samples (a thickness of dielectric layers was 4 $\mu$m) and an evaluation was made by measuring an average lifetime. The results are shown in Table 1 and Table 2. The high temperature load lifetime becomes particularly important when making the dielectric layers thinner, and the lifetime was defined to be a time until resistance falls by one digit from starting of the application in the evaluation.

Note that an atomic % of the first subcomponent and the mole number of the second subcomponent are values expressed in a conversion of metal element at a ratio with respect to 100 moles of the above main component. Also, the mole number of the third subcomponent is a value expressed in a conversion of oxide at a ratio with respect to 100 moles of the main component. Also, "mE+n" means "m×10$^{+n}$" in specific resistance ($\rho$) values in the tables.

TABLE 1

| Sample No. | | First Subcomponent Kind | First Subcomponent Atomic % | Firing Temperature (° C.) | Specific Dielectric Constant $\epsilon$ | Specific Resistance $\rho$ ($\Omega$ cm) | Capacity-Temperature Characteristic $\tau c$ (1 MHz) (ppm/° C.) | $\Delta \tau c$ (= $\tau c_{100\ Hz}$ − $\tau c_{1\ MHz}$) (ppm/° C.) | Dielectric Loss tan $\delta$ (%) (@ 100 Hz, 160° C.) | High Temperature Load Lifetime (Time) |
|---|---|---|---|---|---|---|---|---|---|---|
| 1 | Comparative | V | 0 | 1300 | 126 | 8E+13 | −1540 | 140 | 2.3 | 0.9 |
| 2 | Example | V | 0.1 | 1300 | 123 | 7E+13 | −1550 | 30 | 0.36 | 147 |

Note that
m = 1 in main component
x = 0.4 and y = 0.6 in main component
number of moles in a conversion of metal element is 0.37 in Second Subcomponent (MnCO3)
number of moles of Third Subcomponent (SiO2 + CaO) is (0.4 + 0.4) mole
conditions of measuring high temperature load lifetime: 200° C., DC15 V/$\mu$m

TABLE 2

| Sample No. | | First Subcomponent Kind | First Subcomponent Atomic % | Firing Temperature (° C.) | Specific Dielectric Constant $\epsilon$ | Specific Resistance $\rho$ ($\Omega$ cm) | Capacity-Temperature Characteristic $\tau c$ (1 MHz) (ppm/° C.) | $\Delta \tau c$ (= $\tau c_{100\ Hz}$ − $\tau c_{1\ MHz}$) (ppm/° C.) | Dielectric Loss tan $\delta$ (%) (@ 100 Hz, 160° C.) | High Temperature Load Lifetime (Time) |
|---|---|---|---|---|---|---|---|---|---|---|
| 3 | Comparative | V | 0 | 1300 | 80 | 2.3E+14 | −740 | 80 | 3.1 | 0.3 |
| 4 | Example | V | 0.05 | 1300 | 82 | 5E+14 | −740 | 40 | 0.6 | 3 |
| 5 | Example | V | 0.1 | 1300 | 79 | 5.8E+14 | −740 | 10 | 0.3 | 5 |
| 6 | Example | V | 0.2 | 1280 | 84 | 6.5E+14 | −750 | 20 | 0.3 | 33 |

TABLE 2-continued

| Sample No. | First Subcomponent Kind | First Subcomponent Atomic % | Firing Temperature (° C.) | Specific Dielectric Constant $\epsilon$ | Specific Resistance $\rho$ ($\Omega$ cm) | Capacity-Temperature Characteristic $\tau c$ (1 MHz) (ppm/° C.) | $\Delta\tau c$ (= $\tau c_{100\ Hz}$ − $\tau c_{1\ MHz}$) (ppm/° C.) | Dielectric Loss tan δ (%) (@ 100 Hz, 160° C.) | High Temperature Load Lifetime (Time) |
|---|---|---|---|---|---|---|---|---|---|
| 7 | Example | V | 1 | 1280 | 81 | 9E+13 | −740 | 10 | 0.4 | 124 |
| 8 | Example | V | 2 | 1280 | 83 | 3.3E+13 | −750 | 20 | 0.4 | >250 |
| 9 | Comparative | V | 5 | 1280 | —* | —* | —* | —* | —* | —* |

Note that
m = 1 in main component
x = 0.4 and y = 0.36 in main component
number of moles in a conversion of metal element is 0.37 in Second Subcomponent (MnCO3)
number of moles of Third Subcomponent (SiO2 + CaO) is (0.4 + 0.4) mole
conditions of measuring high temperature load lifetime: 200° C., DC30 V/μm
*becoming semiconductive and unable to function as capacitor From the results shown in Table 1 and Table 2, the following facts are understood as to an adding amount of the first subcomponent. When V is not added at all as in the sample 1 and sample 3, the high temperature load lifetime becomes extremely short. When an adding amount of V is too large as in the sample 5, it becomes semiconductive and unable to function as a capacitor. On the other hand, in the samples 2 and 4 to 8 wherein a predetermined amount of the first subcomponent was included, it was confirmed that a dielectric ceramic composition having sufficient specific dielectric constant and insulation resistance, not reduced even by being fired in a reducing atmosphere, not oxidizing nickel as an internal electrode material and having excellent reducing resistance property was obtained. It was also confirmed that the capacity-temperature characteristic was excellent, moreover, low frequency dielectric dispersion could be suppressed (tan δ at 100 Hz and 160° C. was small, and a capacity-temperature coefficient difference $\Delta\tau c$ at 1 MHz and 100 Hz was small) and a high temperature load lifetime (an accelerated lifetime of insulation resistance) could be improved. Note that the samples 2 and 4 to 8 are examples of the present invention and the samples 1 and 3 are comparative examples of the present invention.

EXAMPLE 2

Capacitor samples were obtained in the same way as in the example 1 except that an oxide of W was used instead of the V oxide and that a composition after firing becomes the blending ratios shown in Table 3. The same evaluations were made. The results are shown in Table 3.

TABLE 3

| Sample No. | First Subcomponent Kind | First Subcomponent Atomic % | Firing Temperature (° C.) | Specific Dielectric Constant $\epsilon$ | Specific Resistance $\rho$ ($\Omega$ cm) | Capacity-Temperature Characteristic $\tau c$ (1 MHz) (ppm/° C.) | $\Delta\tau c$ (= $\tau c_{100\ Hz}$ − $\tau c_{1\ MHz}$) (ppm/° C.) | Dielectric Loss tan δ (%) (@ 100 Hz, 160° C.) | High Temperature Load Lifetime (Time) |
|---|---|---|---|---|---|---|---|---|---|
| 10 | Comparative | W | 0 | 1300 | 55 | 8.1E+14 | −520 | 120 | 2.8 | 0.2 |
| 11 | Example | W | 0.1 | 1300 | 53 | 1.2E+15 | −520 | 20 | 0.3 | 8 |
| 12 | Example | W | 0.2 | 1280 | 58 | 9E+14 | −520 | 30 | 0.4 | 22 |
| 13 | Example | W | 1 | 1280 | 56 | 3.4E+14 | −510 | 10 | 0.3 | 89 |
| 14 | Example | W | 2 | 1280 | 52 | 9E+13 | −520 | 20 | 0.3 | 150 |
| 15 | Comparative | W | 5 | 1280 | —* | —* | —* | —* | —* | —* |

Note that
m = 1 in main component
x = 0.4 and y = 0.24 in main component
number of moles in a conversion of metal element is 0.37 in Second Subcomponent (MnCO3)
number of moles of Third Subcomponent (SiO2 + CaO) is (0.4 + 0.4) mole
conditions of measuring high temperature load lifetime: 200° C., DC60 V/μm
*becoming semiconductive and unable to function sa capacitor From the results shown in Table 3, the following facts are understood as to an adding amount of the first subcomponent. When W is not added at all as in the sample 10, the high temperature load lifetime becomes extremely short. When an adding amount of W is too large as in the sample 15, it becomes semiconductive and unable to function as a capacitor. On the other hand, in the samples 11 to 14 wherein a predetermined amount of the first subcomponent was included, it was confirmed that a dielectric ceramic composition having sufficient specific dielectric constant and insulation resistance, not reduced even by being fired in a reducing atmosphere, not oxidizing nickel as an internal electrode material and having excellent reducing resistance was obtained. It was also confirmed that the capacity-temperature characteristic was excellent, moreover, low frequency dielectric dispersion could be suppressed and a high temperature load lifetime could be improved. Note that the samples 11 to 14 are examples of the present invention and the samples 10 and 15 are comparative examples of the present invention.

EXAMPLE 3

Capacitor samples were obtained in the same way as in the example 1 except that a Mo oxide was used instead of the V oxide and that a composition after firing becomes blending ratios shown in Table 4. The same evaluations were made. The results are shown in Table 4.

TABLE 4

| Sample No. | First Subcomponent Kind | First Subcomponent Atomic % | Firing Temperature (° C.) | Specific Dielectric Constant $\epsilon$ | Specific Resistance $\rho$ ($\Omega$ cm) | Capacity-Temperature Characteristic $\tau c$ (1 MHz) (ppm/° C.) | $\Delta\tau c$ (= $\tau c_{100\ Hz}$ − $\tau c_{1\ MHz}$) (ppm/° C.) | Dielectric Loss tan δ (%) (@ 100 Hz, 160° C.) | High Temperature Load Lifetime (Time) |
|---|---|---|---|---|---|---|---|---|---|
| 16 | Comparative | Mo | 0 | 1300 | 38 | 5.1E+15 | −220 | 70 | 1.8 | 3 |
| 17 | Example | Mo | 0.1 | 1280 | 36 | 3.8E+15 | −230 | 10 | 0.1 | 62 |
| 18 | Example | Mo | 0.2 | 1280 | 38 | 1.6E+15 | −220 | 20 | 0.1 | 183 |
| 19 | Example | Mo | 1 | 1280 | 35 | 8E+14 | −210 | 10 | 0.2 | >250 |
| 20 | Example | Mo | 2 | 1280 | 37 | 1E+14 | −220 | 10 | 0.1 | >250 |
| 21 | Comparative | Mo | 5 | 1280 | —* | —* | —* | —* | —* | —* |

Note that
m = 1 in main component
x = 0.4 and y = 0.12 in main component
number of moles in a conversion of metal element is 0.37 in Second Subcomponent (MnCO3)
number of moles of Third Subcomponent (SiO2 + CaO) is (0.4 + 0.4) mole
conditions of measuring high temperature load lifetime: 200° C., DC60 V/μm
*becoming semiconductive and unable to function as capacitor From the results shown in Table 4, the following facts are understood as to an adding amount of the first subcomponent. When Mo is not added at all as in the sample 16, a high temperature load lifetime becomes extremely short. When an adding amount of Mo is too large as in the sample 21, it becomes semiconductive and unable to function as a capacitor. On the other hand, in the samples 17 to 20 wherein a predetermined amount of the first subcomponent was included, it was confirmed that a dielectric ceramic composition having sufficient specific dielectric constant and insulation resistance, not reduced even by being fired in a reducing atmosphere, not oxidizing nickel as an internal electrode material and having excellent reducing resistance was obtained. It was also confirmed that the capacity-temperature characteristic was excellent, moreover, low frequency dielectric dispersion could be suppressed and a high temperature load lifetime could be improved. Note that the samples 17 to 20 are examples of the present invention and the samples 16 and 21 are comparative examples of the present invention.

What is claimed is:

1. A dielectric ceramic composition comprising:
    a main component including a dielectric oxide expressed by a composition formula $\{(Ca_{1-x}Me_x)O\}_m \cdot (Zr_{1-y}Ti_y)O_2$, and
    a first subcomponent including an oxide of V and a compound which becomes an oxide of V after firing;
    wherein a symbol Me in the formula included in said main component is at least one of Sr and Mg,
    symbols m, x and y indicating composition mole ratios in the formula included in said main component are $0.8 \leq m \leq 1.3$, $0 \leq x \leq 1.00$ and $0.1 \leq y \leq 0.6$, and
    a ratio of said first subcomponent to 100 moles of said main component is 0.01 atomic % ≦ the first subcomponent < 5 atomic % in a conversion of metal element in an oxide.

2. The dielectric ceramic composition as set forth in claim 1, further comprising a third subcomponent including at least one of oxides of Si, M (note that M is at least one element of Ba, Ca, Sr and Mg), Li and B and compounds which become an oxide of these after firing; and
    wherein a ratio of said third subcomponent to 100 moles of said main component is 0 mole < the third subcomponent < 15 moles in a conversion of oxide.

3. The dielectric ceramic composition as set forth in claim 1, further comprising a third subcomponent including at least one of oxides of Si and Sr and compounds which become an oxide of these after firing; and
    wherein a ratio of said third subcomponent to 100 moles of said main component is 0 mole < the third subcomponent < 15 moles in a conversion of oxide.

4. The dielectric ceramic composition as set forth in claim 1, wherein a static capacitance change rate (ΔC) to a temperature is −3000 ppm/° C. to 0 ppm/° C. (note that a reference temperature of a static capacitance C is 25° C.) in a temperature range of at least 25° C. to 125° C.

5. The dielectric ceramic composition as set forth in claim 2, wherein a static capacitance change rate (ΔC) to a temperature is −3000 ppm/° C. to 0 ppm/° C. (note that a reference temperature of a static capacitance C is 25° C.) in a temperature range of at least 25° C. to 125° C.

6. The dielectric ceramic composition as set forth in claim 3, wherein a static capacitance change rate (ΔC) to a temperature is −3000 ppm/° C. to 0 ppm/° C. (note that a reference temperature of a static capacitance C is 25° C.) in a temperature range of at least 25° C. to 125° C.

7. An electronic device, comprising a dielectric layer composed of a dielectric ceramic composition, wherein:
    said dielectric composition comprises
    a main component including a dielectric oxide expressed by a composition formula $\{(Ca_{1-x}Me_x)O\}_m \cdot (Zr_{1-y}Ti_y)O_2$, and
    a first subcomponent including an oxide of V and a compound which becomes an oxide of V after firing;
    wherein a symbol Me in the formula included in said main component is at least one of Sr and Mg,
    symbols m, x and y indicating composition mole ratios in the formula included in said main component are $0.8 \leq m \leq 1.3$, $0 \leq x \leq 1.00$ and $0.1 \leq y \leq 0.6$, and
    a ratio of said first subcomponent to 100 moles of said main component is 0.01 atomic % ≦ the first subcomponent < 5 atomic % in a conversion of metal element in an oxide.

8. The electronic device as set forth in claim 7, comprising a capacitor element body wherein said dielectric layers and internal electrode layers are alternately stacked.

9. The electronic device as set forth in claim 8, wherein a conductive material included in said internal electrode layer is nickel or a nickel alloy.

10. The dielectric ceramic composition as set forth in claim 1, further comprising a second subcomponent containing at least one of an oxide of Mn and compounds which become an oxide of Mn by firing; and wherein a ratio of said second subcomponent to 100 moles of said main component is 0 mole$\leq$the second subcomponent<4 moles in a conversion of metal element in an oxide.

11. The electronic device, comprising a dielectric layer composed of a dielectric ceramic composition as set forth in claim 7, wherein:

said dielectric ceramic composition further comprises a second subcomponent containing at least one of an oxide of Mn and compounds which become an oxide of Mn by firing; and wherein a ratio of said second subcomponent to 100 moles of said main component is 0 mole$\leq$the second subcomponent<4 moles in a conversion of metal element in an oxide.

12. The electronic device, comprising a dielectric layer composed of a dielectric ceramic composition as set forth in claim 7, wherein:

said dielectric ceramic composition further comprises a third subcomponent including at least one of oxides of Si, M (note that M is at least one element of Ba, Ca, Sr and Mg), Li and B and compounds which become an oxide of these after firing; and wherein a ratio of said third subcomponent to 100 moles of said main component is 0 mole<the third subcomponent<15 moles in a conversion of oxide.

* * * * *